Figure 1:
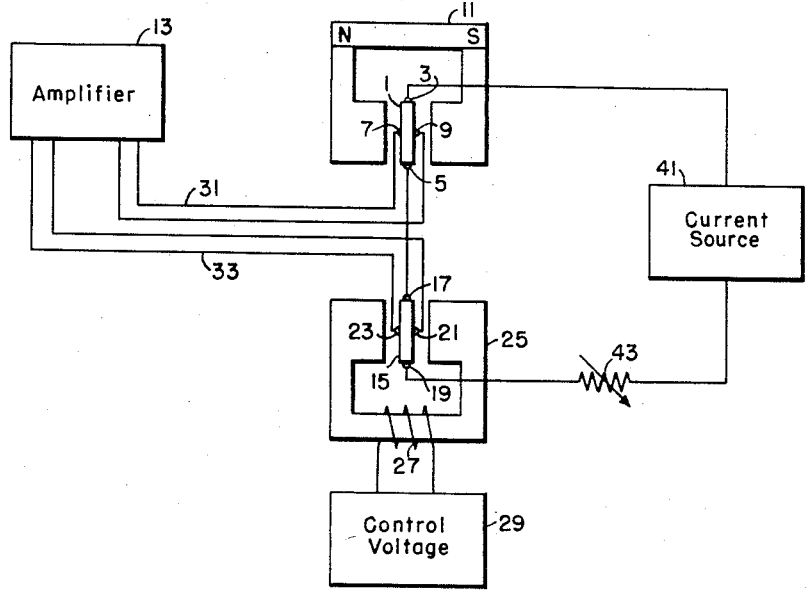

May 5, 1959    M. TSCHERMAK    2,885,629
CONTROL DEVICE UTILIZING HALL-EFFECT PLATES
Filed Sept. 12, 1955

United States Patent Office 2,885,629
Patented May 5, 1959

2,885,629

CONTROL DEVICE UTILIZING HALL-EFFECT PLATES

Manfred Tschermak, Erlangen, Germany, assignor to Siemens-Schuckertwerke Aktiengesellschaft, Erlangen, Germany, a corporation of Germany Application September 12, 1955, Serial No. 533,816

Claims priority, application Germany September 18, 1954

5 Claims. (Cl. 323—74)

This invention relates to electrical control devices and more particularly to control devices utilizing Hall-effect plates as elements thereof.

Hall-effect plates have been known for a number of years and have been used as elements in electrical motor control systems, regulating devices and the like. Briefly described, the Hall-effect is the property of a semiconductive plate to generate a voltage across the secondary or output terminals of the plate when an input current flows through the plate at right angles to the axis of the output terminals and in the plane of the plate, and when the plate is placed in a magnetic field such that the lines of flux thereof pass through the plane of the plate generally normal thereto. The direction of polarity of the voltage depends on the direction of current flow and the direction of magnetic flux, and its magnitude is related to magnetic field strength and the strength of the input current.

In one type of control device utilizing Hall plates, the plates are connected so that the primary current flow therethrough is in a series path through the plates, the same current traversing both plates. A steady magnetic field, such as is provided by a permanent magnet, is applied to one plate, the magnitude of which field represents a reference quantity. The output circuits of the plates are connected to an additional control device such as a magnetic amplifier so that the Hall-plate output voltages differentially vary the output thereof. The magnetic field applied to the other Hall plate is varied in accordance with the magnitude of a control quantity so that the difference between the reference quantity and the control quantity is represented as the difference between the magnitudes of the output voltages of the Hall plates and thus the magnitude of the output signal from the magnetic amplifier.

A disadvantage of the prior-art system briefly described above lies in the time delay that arises when it becomes necessary to vary the magnetic field applied to the second Hall plate due to changes in the magnitude of the control quantity. A second disadvantage lies in the requirement of a magnetic amplifier or similar device to combine the output voltages of the Hall plates to obtain a single output signal, one characteristic of which has a magnitude proportional to the difference between the reference quantity and the control quantity.

An object of this invention is to provide a control device utilizing Hall plates wherein a reference quantity is represented as the magnitude of the magnetic field influencing one Hall plate, having a minimum time delay.

Another object is to provide a control device utilizing Hall plates wherein a reference quantity is represented as the magnitude of the magnetic field influencing one Hall plate, the output voltages of the Hall plates being combined directly with a minimum of auxiliary equipment for combining purposes.

Still another object is to provide a control device utilizing Hall plates wherein a reference quantity is represented as the magnitude of the magnetic field influencing one Hall plate and wherein the magnetic fields associated with the Hall plates are maintained relatively constant in magnitude.

Yet another object is to provide a control device utilizing Hall plates wherein a reference quantity is represented as the magnitude of the magnetic field influencing one Hall plate having improved operational characteristics.

Figure 2:
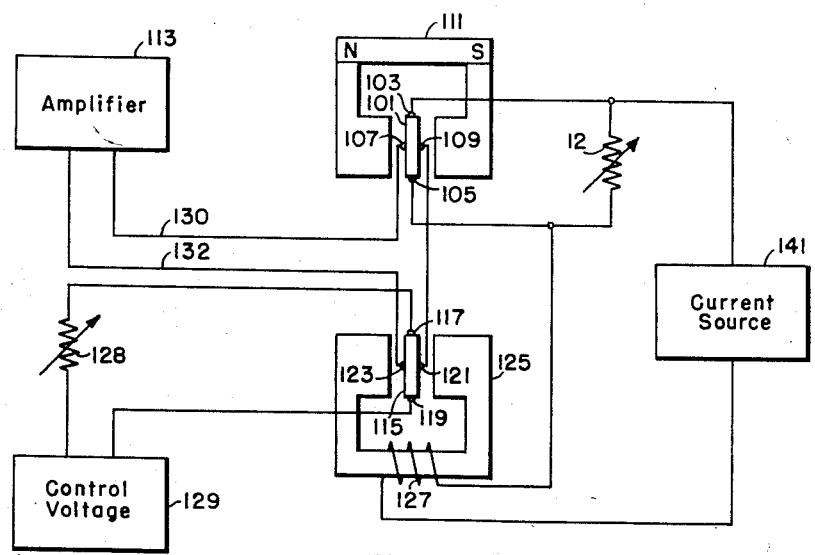

Other objects and features of this invention will become apparent upon consideration of the following description thereof when taken in connection with the accompanying drawings, wherein:

Figure 1 is a schematic diagram of an example of the prior art generally described above; and Fig. 2 is a schematic diagram of an embodiment of this invention.

According to one aspect of this invention, a pair of Hall plates are arranged so that one is placed in a magnetic field having a field strength proportional to the reference quantity under consideration, and the second Hall plate is in a magnetic field having a strength proportional to the input current traversing the first Hall plate, the control quantity being represented by the input current through the primary circuit of the second Hall plate. The relationship between the magnitudes of the output voltages of the Hall plates will be proportional to the relative magnitudes of the reference quantity and the control quantity so that the output voltages can be differentially combined directly and the output voltage derived hereby will be expressive of the desired relationship.

The prior art device shown in Fig. 1 includes a pair of Hall-effect plates 1 and 15, respectively, disposed within the air gaps of permanent magnet 11 and electromagnet 25. A current source 41 is connected to current input terminals 3 and 19 of plates 1 and 15, respectively, through variable resistor 43; the other current input terminals 5 and 17 of plates 1 and 15 are connected together so that the input current conduction paths of plates 1 and 15 are in a series circuit with resistor 43. A control voltage source 29, the magnitude of the output of which represents the control quantity, is connected to energize control winding 27 of electromagnet 25 so that the field strength of the magnetic field within the air gap of the magnet is also representative of the magnitude of the control quantity. The output terminals 7 and 9 of Hall-effect plate 1 and the output terminals 21 and 23 of Hall-effect plate 15 are connected to a mixing amplifier 13 by means of conductors pairs 31 and 33, respectively. Finally, each conductor pair may be connected to a control winding of a magnetic amplifier so that a characteristic of the output signal of the amplifier is indicative of the difference in the magnitudes of the output voltages appearing across terminal pairs 7, 9 and 21, 23.

The magnitude of the output voltage appearing across a Hall plate can be represented by the equation $$E = KHI$$

where K is a constant depending on the chemical nature and dimensions of the semiconductor, H is the field strength of the magnetic field applied thereto and I is the input current traversing the semiconductor. When the field strength of the magnetic field within the air gap of permanent magnet 11 is indicative of the reference quantity, and the field strength within the air gap of electromagnet 25 is indicative of the control or variable quantity, the difference in the output voltages of the Hall plates will be indicative of the relationship between the control and reference quantities since the same input current traverses both Hall plates.

As indicated above, the time delay inherent in electromagnet 25 has been found to be undesirable for many control applications and the use of an additional amplifier for mixing purposes has also proved undesirable for many purposes. These disadvantages are not present in the invention exemplified by the circuitry of Fig. 2, wherein Hall plates 101 and 115 are disposed within the permanent magnet 111 and electromagnet 125, respectively, so that the lines of flux of each of the two magnets traverse the thin dimension of the Hall-effect plate associated therewith.

Control voltage source 129 is coupled to current input terminals 117 and 119 by means of variable resistor 128. Current source 141 functions to provide excitation current for control winding 127 of permanent magnet 125 and input current for Hall-effect plate 101, and may be a battery or a rectified and filtered power supply energized from A.C. lines. Control winding 127 is serially connected with parallel-connected resistor 12 and Hall-effect plate 101, resistor 12 being connected between current input terminals 103 and 105 of plate 101, and the entire series circuit is connected across the output terminals of current source 141. The function of resistor 12 is to adjust the portion of the current from winding 127 that traverses Hall-effect plate 101 between the input terminals 103 and 105 thereof. The output voltages appearing across terminal pairs 107, 109 and 121, 123 of plates 101 and 115, respectively, may be equalized by varying resistor 12 assuming a current of predetermined magnitude traversing plate 115 between the input terminals 117 and 119 thereof.

Assuming that a current $I_x$, proportional to the control quantity, is flowing through resistor 128 and Hall-effect plate 115 from source 129, that a current $I_0$ is flowing through winding 127, and that an input current $CI_0$ is flowing through plate 101 between terminals 103 and 105 (the factor "C" being dependent on the resistance of resistor 12), then voltages $E_{h1}$ and $E_{h2}$ will be produced across the output terminals of the Hall-effect plates according to the following equations:

$$E_{h1} = K_1 B_0 C I_0$$
$$E_{h2} = K_2 I_0 I_x$$

where $K_1$ and $K_2$ are constants dependent upon the chemical nature and dimensions of the Hall-effect plates, $B_0$ is the flux produced by permanent magnet 111, $E_{h1}$ is the Hall voltage produced by Hall plate 101, and $E_{h2}$ is the voltage produced by Hall plate 115. The differential voltage appearing across lines 130 and 132 will be expressed by the equation:

$$E_0 = E_{h1} - E_{h2}$$
$$= I_0 (K_1 B_0 C - K_2 I_x)$$

The magnitude of the current $I_0$ flowing through winding 127 influences only the amount of the produced Hall voltage difference at a given value of $I_x$. When the control system is adjusted so as to be in balance so that there is zero output across lines 130, 132, the effect of $I_0$ is cancelled out; therefore, the current $I_0$ need not be maintained particularly constant.

It can be observed that in the control device described immediately above, the current $I_x$ which is proportional to the control quantity flows only through ohmic resistances, so that any change in the control quantity will not result in a delay in the change in the difference of the output voltages from the respective Hall-plates. Additionally, the adjustment of the reference value can be performed in various ways, such as by changing the magnitudes determining the proportionality-coefficients $K_1$, $K_2$ and C, and most conveniently by varying resistor 12.

The invention is not to be restricted to the specific structural details, arrangement of parts or circuit connections herein set forth as various modifications thereof may be effected without departing from the spirit and scope of this invention.

I claim as my invention:

1. Control apparatus comprising: first and second semiconductive means each adapted to produce a voltage across first and second terminals thereon functionally related to the strength of a magnetic field passing therethrough and to the magnitude of an electric current passing between third and fourth terminals thereon; electromagnet means having a control winding in inductive relationship therewith for producing a magnetic field through said first semiconductive means; permanent magnet means for producing a magnetic field through said second semiconductive means; resistance means connected between said third and fourth terminals of said second semiconductive means; current source means coupled across said third and fourth terminals of said semiconductive means through said control winding means; load terminals for said control apparatus, said first and second semiconductive means being serially connected across said load terminals through the current conduction path defined by said first and second terminals thereof so that the voltages generated across said first and second terminals thereof are in series opposition.

2. In a control system of the type utilizing first and second semiconductive means for generating Hall-effect voltages between first and second terminals thereon proportional to current flowing between third and fourth terminals thereon, wherein a reference quantity is represented by a permanent magnet for supplying a magnetic field for said first semiconductive means and a control quantity is represented by a current of variable magnitude passing between said third and fourth terminals of said second semiconductive means; electromagnetic means having a control winding in inductive relationship therewith for producing a magnetic field through said second semiconductor means; current supply means for supplying current between said third and fourth terminals of said first semiconductor means through said control winding; resistance means connected between said third and fourth terminals of said first semiconductor means adapted to vary the current therethrough so that the voltages generated across said first and second terminals of said semiconductor means are substantially equal with a predetermined current through said second semiconductor means from said current supply means; the output voltage of said control system comprising said voltages between said first and second terminals of said first and second semiconductor means connected in series opposition.

3. Control apparatus comprising, first means for generating a first magnetic field of a given field strength, second means for generating a second magnetic field of variable field strength in accordance with the magnitude of the current flowing through a winding inductively associated therewith; first and second semiconductive bodies each adapted to generate voltages functionally related to the strength of a magnetic field imposed thereon and the magnitude of electric current flowing therethrough; said first body being disposed in said first magnetic field and said second body being disposed in said second magnetic field, with the current-conduction path of resistance means parallel-connected to said first body; a source of exciting current for said winding coupled thereto through said first body and said parallel-connected resistance means; control voltage means connected to said second body to supply electric current thereto, said first and second bodies being connected so that the voltages generated thereby are connected in series opposition to provide an output circuit for said control apparatus.

4. Control apparatus for deriving an output signal having a magnitude proportional to the difference between the magnitudes of a reference signal and a control signal comprising: first and second Hall-voltage plates, each being adapted to derive an output voltage functionally related to the electrical current through the plate and the strength of a magnetic field placed thereon; a permanent magnet for producing a magnetic field for said first Hall-voltage plate; a magnetic core having a winding thereon for producing a magnetic field for said second Hall-voltage plate; means including the current conduction path of said first Hall-voltage plate and a variable resistor in parallel for energizing said winding on said core; said reference signal being connected to the current conduction path of said second Hall plate.

5. A Hall-effect converter comprising: first and second Hall-effect plates; a first direct current primary input circuit connected across first opposite edges of said first plate; electromagnetic means having a winding in inductive relationship therewith for producing a magnetic field through the thin dimension of said first plate; permanent magnet means for producing a magnetic field through the thin dimension of said second plate; resistance means connected across first opposite edges of said second plate; a current source connected to said parallel-connected second plate and resistance means through said winding; output terminals for said converter; second opposite edges of said first and second plates being serially connected across said output terminals so that voltages developed thereacross are in bucking relationship.

References Cited in the file of this patent
UNITED STATES PATENTS 1,825,855   Craig ------------------ Oct. 6, 1931